Dec. 5, 1961  L. A. CURCIO  3,011,184
BUOYANT VEHICLE RAFT
Filed Sept. 11, 1958  4 Sheets-Sheet 1

INVENTOR.
LEONARD ANTHONY CURCIO
BY
*ATTORNEY*

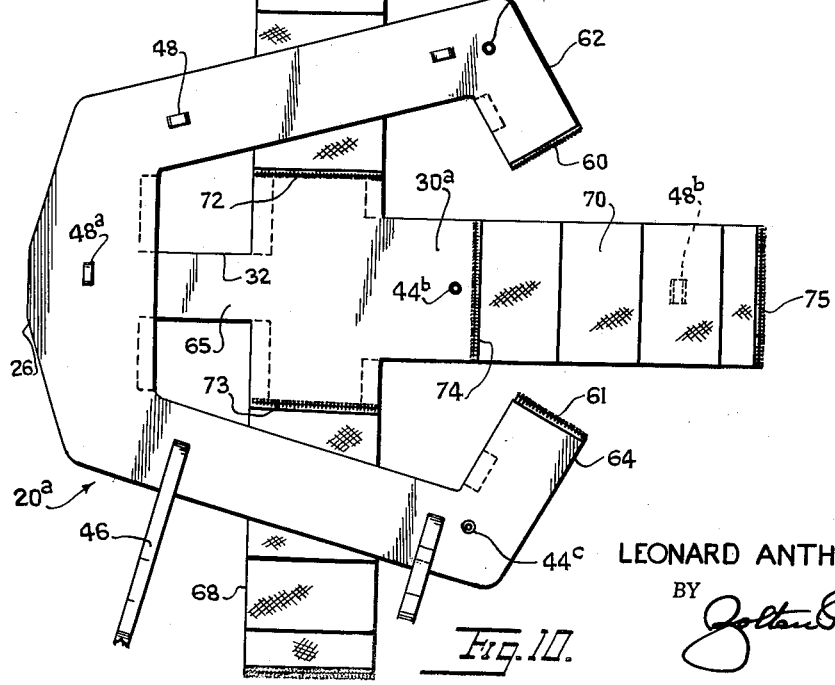

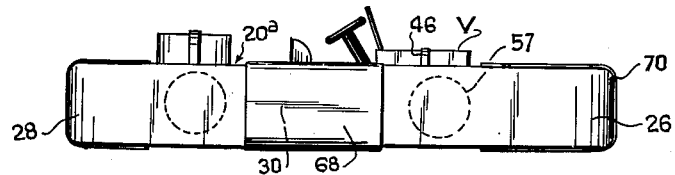
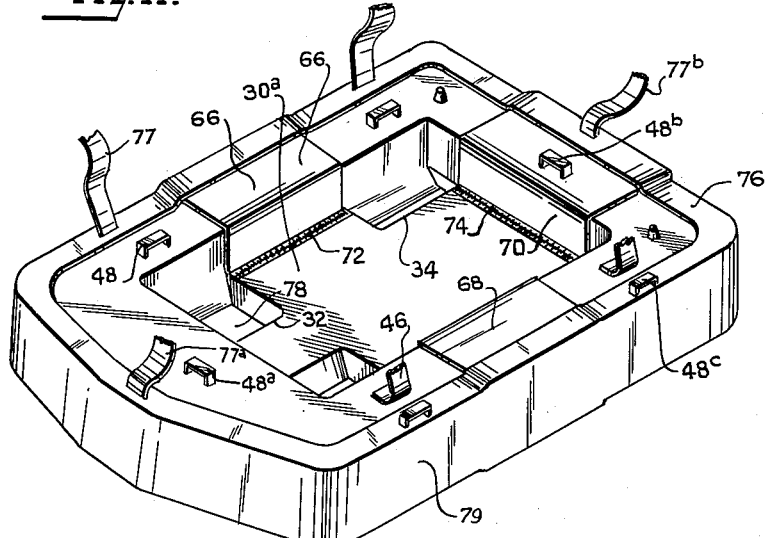
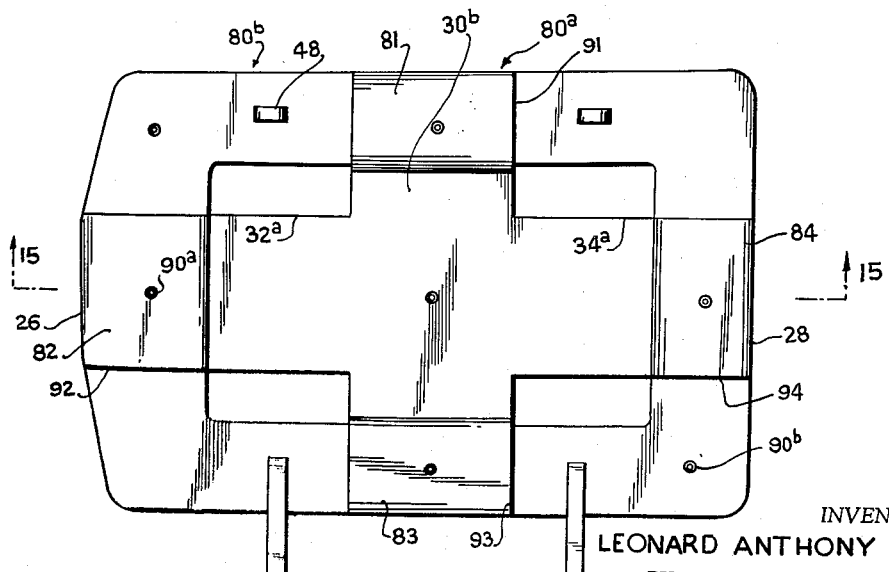

Dec. 5, 1961    L. A. CURCIO    3,011,184
BUOYANT VEHICLE RAFT
Filed Sept. 11, 1958    4 Sheets-Sheet 4
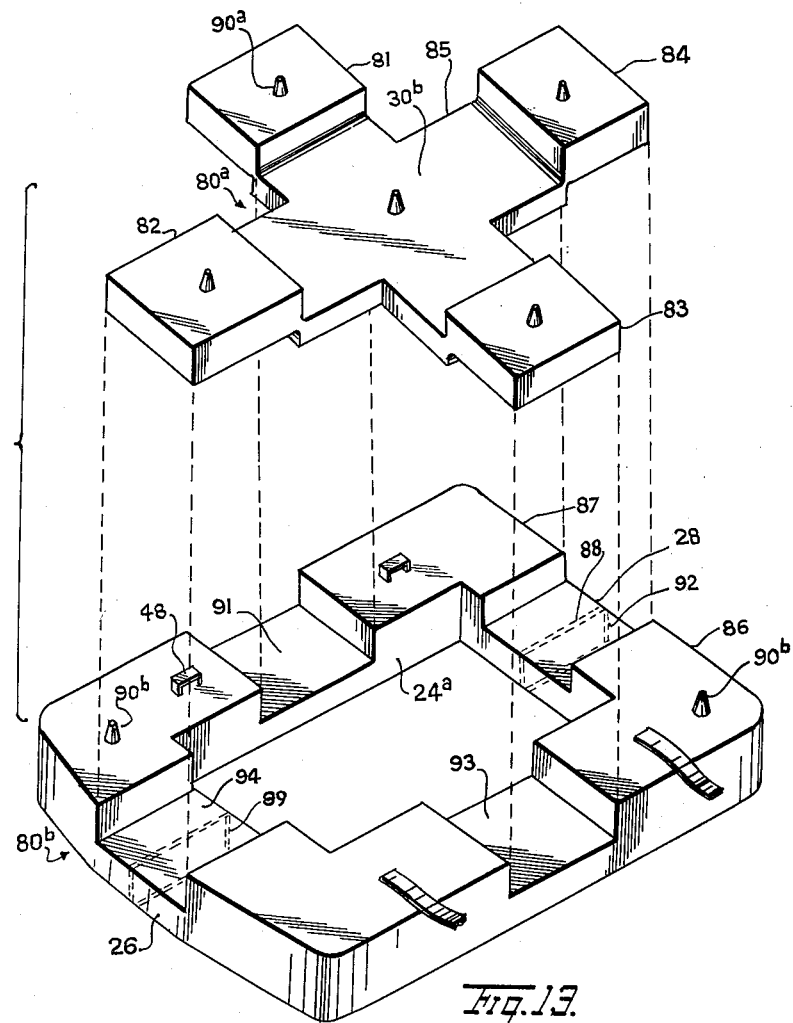
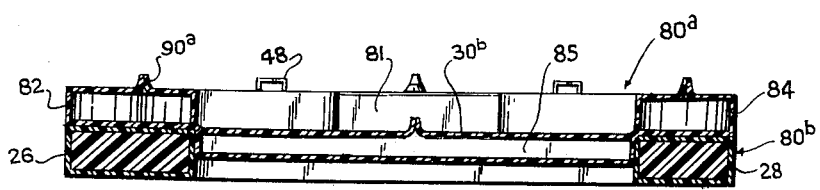
INVENTOR.
LEONARD ANTHONY CURCIO
BY
*ATTORNEY*

United States Patent Office 3,011,184
Patented Dec. 5, 1961

3,011,184
BUOYANT VEHICLE RAFT
Leonard Anthony Curcio, 116 Windsor Terrace,
Yonkers, N.Y.
Filed Sept. 11, 1958, Ser. No. 760,322
3 Claims. (Cl. 9—11)

The present invention relates to a water transportation device for a motor vehicle and has for a principal object to provide a buoyant raft onto which a motor vehicle may be run or placed, the raft being so constructed that the power plant of the vehicle may be used to drive the wheels thereof for propelling the raft.

A further important object of the invention is provision of an inflatable raft adapted for use with a cover as a personnel or cargo raft.

A still further object is provision of a raft formed of a plurality of sections, with separate inflatable compartments provided in the several sections.

Another object is provision of an inflatable raft upon which a motor vehicle can be driven when the raft is in a collapsed condition, the raft being then inflatable to support the motor vehicle on the surface of a body of water.

A still further object is provision of an inflatable raft of the character described in which the raft is provided with openings in a platform so that the wheels of the vehicle can be disposed to propel the raft and vehicle over a body of water.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 3:
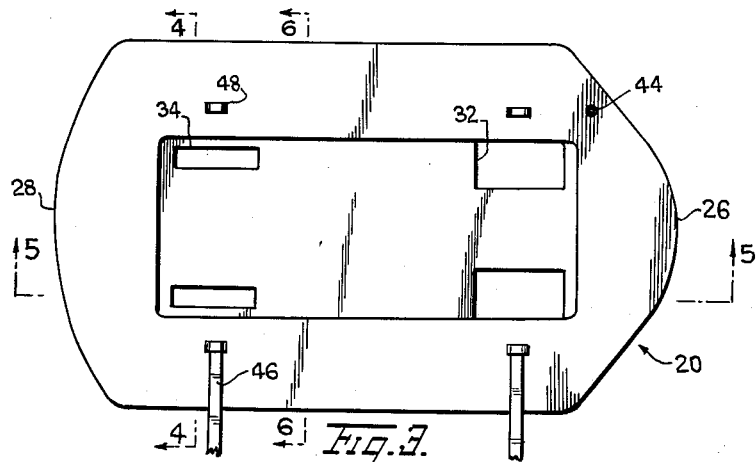
FIG. 3 is a top plan view of the raft.
Figure 5:
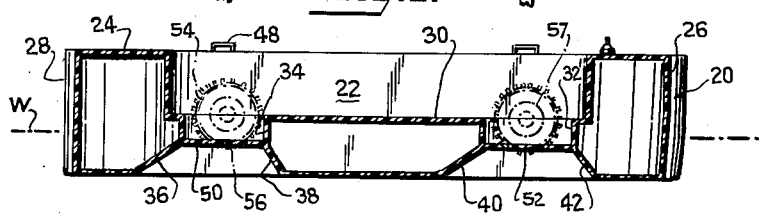

FIGS. 4, 5 and 6 are sectional views taken on lines 4—4, 5—5 and 6—6, respectively, of FIG. 3.

Figure 7:
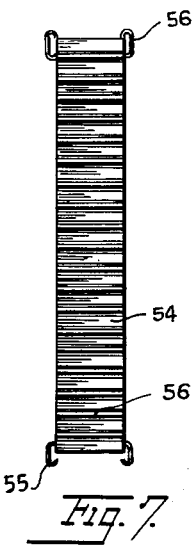

FIG. 7 is a top plan view of a wheel paddle structure in open extended position.

Figure 8:
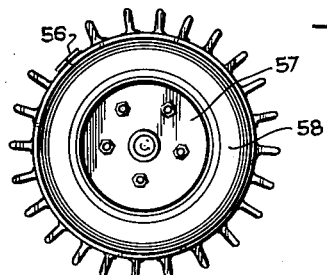

FIG. 8 is an elevational view of the wheel paddle mounted on a vehicle wheel.

FIG. 9 is a perspective view of another raft embodying the invention.

FIG. 10 is a plan view of the raft of FIG. 9 in open extended position for receiving a motor vehicle.

FIG. 11 is a side view of the raft of FIGS. 9 and 10 carrying a motor vehicle therein.

FIG. 12 is a perspective view of the raft of FIGS. 9 and 10 with a cover thereon adapting the raft for carrying personnel and cargo.

FIG. 13 is an exploded perspective view of another raft formed of a plurality of sections having individual compartments.

FIG. 14 is a top plan view of the raft of FIG. 13 in assembled form.

FIG. 15 is a sectional view taken on line 15—15 of FIG. 14.

Figure 1:
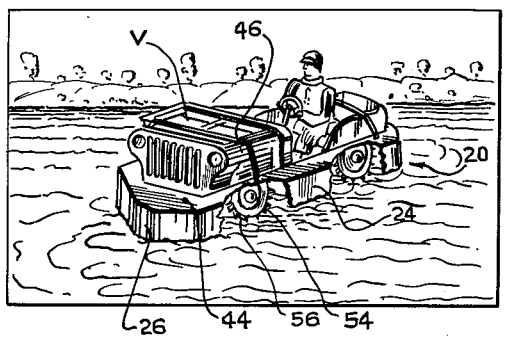
FIG. 1 is a perspective view of one form of raft embodying the invention, with a motor vehicle supported thereon.
Figure 2:
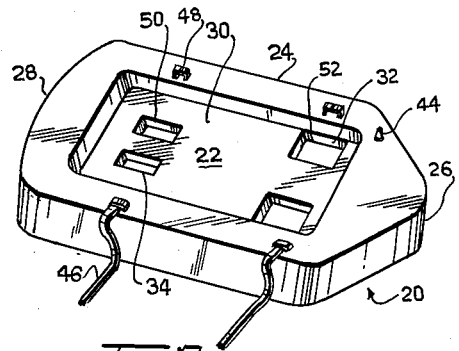
FIG. 2 is a perspective view of the raft according to the invention.

Referring to FIGS. 1–6 there is shown a raft 20 formed by a casing made of an inflatable gas-tight hermetically sealed material such as rubber, plastic, or the like. The raft includes an outer ring 24 enclosing a generally rectangular well 22. The raft has a forward narrower end 26 and a wide curved rear end 28. The well 22 is further defined by a floor or platform 30. This floor is hollow as clearly shown in FIGS. 4–6 and is integral with the casing wall 24. Two wide rectangular openings 32 are provided at the corners of the forward end of the floor and two narrower openings 34 are provided near the corners of the rear end of the floor. The rear openings have obliquely disposed lower walls 36 and 38 as best shown in FIG. 5. The forward openings have obliquely disposed lower walls 40 and 42. A valve 44 is provided on the flat top of casing wall 24 by means of which air, carbon dioxide or other gas can be passed under pressure into the raft for inflating it. Straps 46 and buckles or loops 48 are secured to the top of the raft on opposite sides thereof. The straps can be extended over a motor vehicle such as an automobile, as shown in FIG. 1, to secure the vehicle in the raft.

In operation of the raft, it will be initially deflated so that the vehicle can be run up on the raft. The front wheels of the vehicle will be positioned in the forward openings 32 and the rear wheels will be positioned in the rear openings 34. The raft may then be inflated through valve 44 until the bottom of the vehicle is fully supported on the inflated floor 30 and the wheels are suspended in the openings with the lowermost points of the wheels located just below the bottoms of the constricted straight portions 50, 52 of the openings where they begin to flare outwardly to form the obliquely disposed lower walls 36, 38 and 40, 42. The rear wheels of the vehicle will turn when the motor of the vehicle is run so that the raft is propelled in the water. The front wheels, which are disposed in the larger openings and frictionally engage the water, can be turned laterally to steer the raft by traction. They have the same effect as a pair of forwardly located parallel rudders. If the vehicle has all four wheels driven by the engine, a more rapid propelling action in the water will be had, with the front wheels still turnable to steer the raft. The straps 46 will be tied to the loops 48 after the vehicle V is fully positioned in the compartment 22 and the raft fully inflated.

If a more effective propelling or paddling action is required, the paddle device of FIGS. 7 and 8 may be used. This device is a rubber or plastic belt 54 having a plurality of parallel transverse ridges 56 which will serve as paddles. Hooks 55 and loops 56 are disposed at opposite ends of the belt for securing the paddle belt around a wheel 57, as best shown in FIG. 8. The paddle belts can be mounted on the wheels of the motor vehicle before or after it is secured in place on the raft. In order to avoid running the motor vehicle with the paddles in place over the deflated raft, it is preferable that the paddles be installed after the motor vehicle is mounted in the raft. If desired, the tires 58 of the wheels can be slightly deflated so that the belt can be properly mounted on the tire with the hooks and loops 55, 56 engaged. The tires can then be fully inflated to insure that the paddle belts are securely held on the wheels.

In FIGS. 1 and 5 the position of the paddle belts 54 on the wheels 57 is indicated. The lowermost paddles 56 will project into the water below the water level W. This water level will be preferably disposed between the top of floor 30 and the constricted points 50, 52 of the openings in the floor.

In FIGS. 9, 10 and 11 is shown a further form of raft in which the raft body 20ª is separable at its rear end. Mating slide fasteners 60, 61, preferably made of plastic material so that they are non-corrosive in the presence of sea water, are provided on the facing edges of the separable sections 62 and 64 of the raft body. Floor 30ª has its forward section 65 formed integral with the forward end 26 of the raft body, as clearly shown in FIG. 10. Cloth or plastic flaps 66, 68 and 70 are removably secured to the inflatable floor 30ª. Slide fasteners 72, 73 and 74 are disposed at the inner ends of the flaps where they are joined to the floor. Mating fasteners 75 are provided on the outer free ends of the flaps for engaging with the fasteners at the inner ends of the flaps.

In FIGS. 9 and 10, the raft 20ᵃ is shown assembled with the flaps 66, 68 and 70 respectively encircling the sides and rear of the raft body and reinforcing the structure so that the floor is fully supported and attached to the sides and rear of the raft body. Three valves 44ᵃ, 44ᵇ and 44ᶜ may be provided on the sides and floor of the raft instead of the single valve 44 of FIG. 3 to increase the speed by which the raft can be inflated and deflated. More than one source of gas can be applied to the several valves to speed up the inflating operation and all three valves can be opened simultaneously to deflate the raft when required.

The structure of raft 20ᵃ permits it to be fully inflated before the vehicle V is driven on to it. For this purpose, the raft will be arranged in the open configuration shown in FIG. 10 so that the vehicle can be driven between the separated sections 62, 64 and over the inflated floor 30ᵃ until the wheels of the vehicle extend into the openings 32, 34. After the vehicle is properly located, the sections 62 and 64 will be brought together and secured by fasteners 60, 61 and flaps 66, 68 and 70 in the position shown in FIG. 9. If desired, the raft casing can be only partially inflated while the vehicle is set into place and then the inflation of the casing can be completed after the flaps and fasteners are in place.

Further, buckles or loops 48ᵃ and 48ᵇ may be provided on the front top of the raft 20ᵃ and on one section of flap 70 for use in connection with the cover 79 shown in FIG. 12. This cover is a canvas or plastic sheet which conforms to the outer sides, front and rear of the raft 20ᵃ. Straps 77, 77ᵃ, 77ᵇ on the upper marginal flap 76 of the cover can be engaged in loops 48, 48ᵃ and 48ᵇ. Straps 46 of the raft can be engaged in loops 48ᶜ on the flap 76 of the cover. This cover has a flat bottom 78 which covers the openings 32 and 34 in the floor so that the raft can be used safely as a buoyant carrier for personnel, cargo, and the like.

The raft shown in FIGS. 13–15 is formed of two sections 80ᵃ and 80ᵇ. Upper section 80ᵃ is made of five independent closed compartments 81—85. Section 80ᵇ is formed of two compartment 86, 87 separated by interior partitions 88, 89. Each compartment in the respective sections has its own inflating and deflating valve 90ᵃ or 90ᵇ.

The floor compartment 85 in section 80ᵃ is suspended from the upper outer radiating compartments 81—84. The outer compartments 81—84 fit into corresponding recesses 91—94 in intermediate positions on the front, rear and sides of the underlying section 80ᵇ. When fully assembled, as shown in FIGS. 14 and 15, the assembly is equivalent to that of FIGS. 1–6, and 9–11, with a floor 30ᵇ disposed below the level of the perimeter of the raft ring 24ᵃ and with openings 32ᵃ and 34ᵃ for the wheels of the vehicle defined at the corners of the several assembled sections.

When the cover 79 is mounted on the raft as described in connection with FIG. 12, it is possible to use the raft in an inverted position as a pontoon bridge section. The covered raft can also be used as a well insulated waterproof mattress for one or two persons or more depending on its size. The covered raft can also be used as an emergency lean-to shelter. Several such covered rafts can serve as buoyant carriers for personnel, cargo, and the like.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An inflatable raft for a motor vehicle, comprising a hollow ring inflatable casing formed of gas-tight material, said casing in an inflated condition having a tapered forward portion and a wide rear portion, the perimeter of said casing being formed to define and enclose an open well, said casing being further formed with an inflatable floor having a top depressed below the flat top of the perimeter of the casing, said floor being generally rectangular and having openings near the corners thereof, one pair of said openings near the front of the casing being larger than the pair of openings near the rear of the casing, said openings being adapted to receive the wheels of said vehicle for propelling the raft in a body of water, a pair of straps secured to one side of the casing, a pair of loops for engaging said straps on the other side of the casing, valve means for inflating the casing disposed thereon, said casing being formed with a central sectioned openable rear end, said floor being separate from the sides and rear of the casing, and means for securing the sections of the rear end together and for securing the floor to the sides and rear of the casing, said means comprising fasteners disposed on free facing ends of the sections of the rear end, and flaps attached to sides and rear of the floor for encircling the sides and facing ends of the sections rear of the casing, said flaps having fasteners secured to opposite ends thereof for mating engagement when encircling the sides and rear of the casing.

2. An inflatable raft for a motor vehicle, comprising a hollow ring inflatable casing formed of gas-tight material, said casing in an inflated condition having a tapered forward portion and a wide rear portion, the perimeter of said casing being formed to define and enclose an open well, said casing being further formed with an inflatable floor having a top depressed below the flat top of the perimeter of the casing, said floor being generally rectangular and having openings near the corners thereof, one pair of said openings near the front of the casing being larger than the pair of openings near the rear of the casing, said openings being adapted to receive the wheels of said vehicle for propelling the raft in a body of water, a pair of straps secured to one side of the casing, a pair of loops for engaging said straps on the other side of the casing, valve means for inflating the casing disposed thereon, said casing being formed with a central sectioned openable rear end, said floor being separate from the sides and rear of the casing, and means for securing the sections of the rear end together and for securing the floor to the sides and rear of the casing, said means comprising fasteners disposed on free facing ends of the sections of the rear end, flaps attached to sides and rear of the floor for encircling the sides and facing ends of the sections rear of the casing, said flaps having fasteners secured to opposite ends thereof for mating engagement when encircling the sides and rear of the casing, and a cover having sides conforming to the perimeter of the casing with a flap overlying the casing and a flat bottom underlying the casing.

3. An inflatable raft for a motor vehicle, comprising a hollow ring inflatable casing formed of gas-tight material, said casing in an inflated condition having a tapered forward portion and a wide rear portion, the perimeter of said casing being formed to define and enclose an open well, said casing being further formed with an inflatable floor having a top depressed below the flat top of the perimeter of the casing, said floor being generally rectangular and having openings near the corners thereof, one pair of said openings near the front of the casing being larger than the pair of openings near the rear of the casing, said openings being adapted to receive the wheels of said vehicle for propelling the raft in a body of water, a pair of straps secured to one side of the casing, a pair of loops for engaging said straps on the other side of the casing, valve means for inflating the casing disposed thereon, said casing being formed with a central sectioned openable rear end, said floor being separate from the sides and rear of the casing, and means for securing the sections of the rear end together and for securing the floor to the sides and rear of the casing, said means comprising fasteners disposed on free facing ends of the sections of the rear end, flaps attached to sides and rear of the floor for encircling the sides and facing ends of the sections rear of the casing, said flaps having fasteners secured to opposite ends thereof for mating engagement when encircling the sides and rear of the casing, and a cover having sides conforming to the perimeter of the casing with a flap overlying the casing and a flat bottom underlying the casing, said cover having further straps and loops for engaging the loops and straps on the sides of the casing.

References Cited in the file of this patent

UNITED STATES PATENTS

| | | |
|---|---|---|
| 4,356 | Day | Jan. 15, 1846 |
| 534,275 | Meyer | Feb. 9, 1895 |
| 1,151,435 | Bair | Aug. 24, 1915 |
| 2,497,857 | Benson | Feb. 21, 1950 |

FOREIGN PATENTS

| | | |
|---|---|---|
| 734,139 | Great Britain | July 27, 1955 |
| 1,002,650 | Germany | Feb. 14, 1957 |
| 793,984 | Great Britain | Apr. 23, 1958 |

OTHER REFERENCES

Popular Mechanics, vol. 100, No. 2, Aug. 1953, page 79.